April 29, 1952  J. L. HENDERSON  2,595,075
CYCLE FRAME OR THE LIKE
Filed Feb. 27, 1948  2 SHEETS—SHEET 2
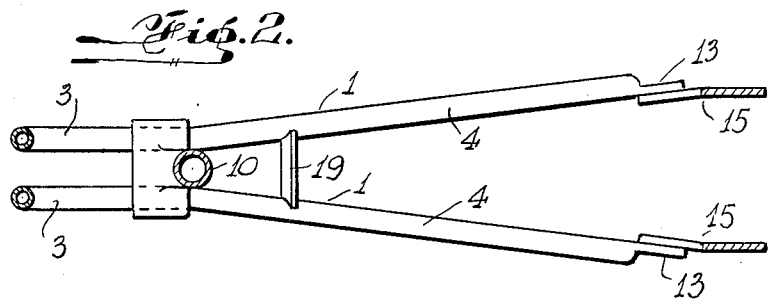
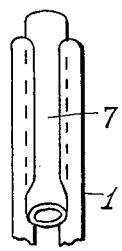
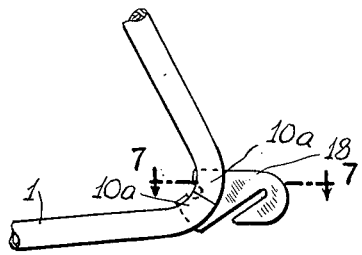
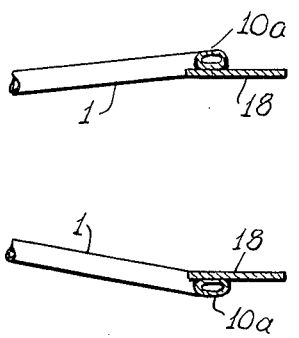
INVENTOR.
JOHN LEONARD HENDERSON
BY Leon M. Strauss Patented Apr. 29, 1952

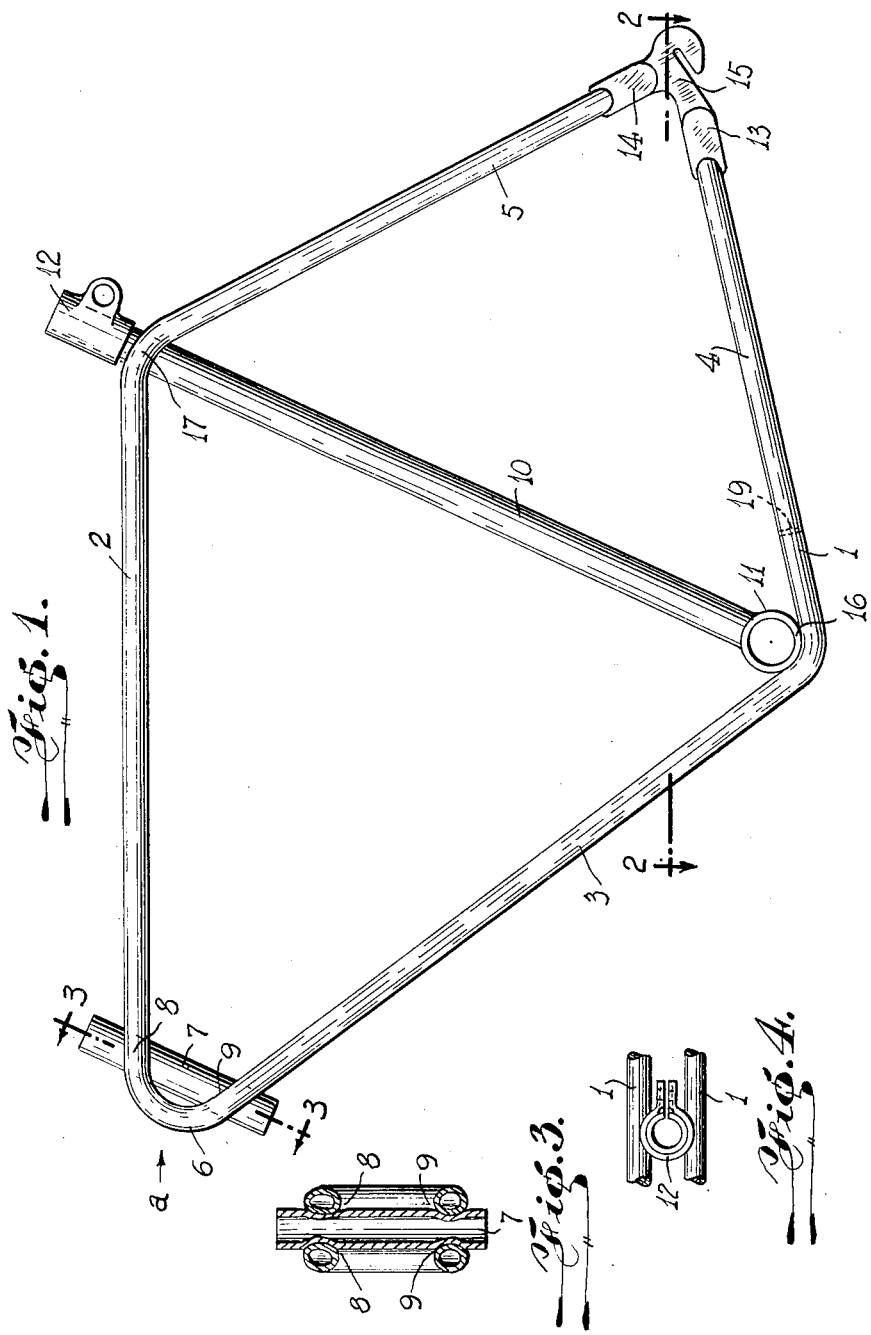

2,595,075

UNITED STATES PATENT OFFICE 2,595,075

CYCLE FRAME OR THE LIKE

John Leonard Henderson, London, England

Application February 27, 1948, Serial No. 11,641
In Great Britain January 15, 1948

2 Claims. (Cl. 219—10)

This invention relates to cycle frames or the like. Heretofore cycle frames have ordinarily been constructed of separate top and bottom frame tubes connected at the front by the steering column, the rear of the bottom bar being connected to a bottom bearing bracket to which a separate chain stay frame and a separate seat pillar tube are connected, and the seat pillar tube is jointed to the rear of the top bar and the rear stay member, and these parts are jointed by socket fittings to which they are brazed. In contradistinction to this known art, the present invention has for its object a simple construction of cycle frame which can be quickly and cheaply assembled. A further object of the invention is to provide means enabling the construction of a cycle frame which reduces the cost of cleaning brazed or welded joints. A still further object of the invention is to provide means ensuring the construction of the cycle frame with a minimum number of parts.

According to the present invention, a cycle frame of the type set forth comprises two coextensive frame members of substantially the same configuration each being formed by bending a bar into a closed loop and jointed together side by side in spaced relationship by parts forming accessory members of the frame and located between the said looped frame members. The joints are conveniently made by heat and pressure between electrodes supplying the resistance heating electric current. Sinkings are produced in the said bars which are tubular by the jointing process to form nesting surfaces which are jointed together. The said looped frame members are adapted to form a closed loop and constitute top frame bars, bottom frame bars, and chain stay and rear stay bars of the cycle frame and such looped frame members are connected together by the steering column and the seat pillar tube positioned between such looped frame members. The ends of the loop bars are conveniently connected by brackets or plates forming supports for the rear wheel axle of the cycle. The looped frame members have curved bends between the top and bottom bar portions and the steering column is jointed at two places at or adjacent each curved bend. The seat tube has the bottom bearing bracket for the crank spindle welded thereto before assembly and such bearing bracket nests on a cradle formed by the looped frame members and is electrically welded or electrically brazed thereto. The invention is more specifically explained in accordance with a preferred embodiment, seen in the attached drawings.

Referring to the drawings:

Figure 1 is a side elevation of a frame constructed according to this invention.

Figure 2 is a section on line 2—2 of Figure 1.

Figure 3 is a section on line 3—3 of Figure 1.

Figure 4 is a fragmentary view looking from the top of the seat pillar tube.

Figure 5 is a front view of the steering column with a portion of the frame jointed thereto.

Figure 6 is a side elevation of a modified portion of the frame, and

Figure 7 is a section on line 7—7 of Figure 6.

According to the present invention the cycle frame comprises a looped frame member 1 formed by bending a length of metal tube to form a closed loop and two such looped frame members are utilised in the construction of the cycle frame. Each looped frame member forms a top bar 2, bottom bar 3, a chain stay bar 4, and a rear stay bar 5, and the curved bend 6 is formed at the junction between the bars 2 and 3. The two frame members 1 are arranged in spaced relationship side by side and the steering column tube 7 is placed between the looped frames 1 to contact such curved bend at two places or otherwise to contact with the bars 2 and 3 at the places 8 and 9. The seat pillar or tube 10 has a tube 11 to form the bottom bearing bracket welded on the bottom, and the upper end of the seat pillar 10 is split and fitted with a split clamping clip 12 for gripping the seat tube. This seat pillar tube 10 is placed between the looped frame members 1 at the junction of the top tube 2 and the rear stay tube 5 and the bottom bearing bracket or tube 11 is nested on the frame members 1 which form a cradle for the bottom bearing bracket 11 at the junction of the bottom tube 3 and the chain stay tube 4. The two ends of the tube forming the looped frame are flattened to form lugs 13 and 14 and such lugs are welded to the bracket or plate 15 which receives the spindle of the rear wheel; the bracket 15 thus joints the ends of the tube forming the looped frame member 1. The joints 8 and 9 of the looped frame member 1 to the steering column, the joints 16 of the frames 1 to the bottom bracket 11, the joints 17 of the frames 1 to the seat pillar tube and the joints of the lugs 13 and 14 to the brackets 15, are made by heat and pressure between the electrodes of a resistance welding machine. The heat and pressure of the electrodes on the tubular members to be jointed, first sinks one tube into the other at the joint just prior to the welding heat being applied so that substantial areas of the tubes are welded together thereby giving a strong joint and as the tubes have a certain amount of interlocking action the joint is further strengthened. The parts constituting the frame are assembled in a jig before the parts are welded together and the welding machine may be arranged so that it has a number of welding electrodes equivalent to the joints to be made, thereby enabling the cycle frames to be assembled with great rapidity. Bridge pieces 19 are fixed between the chain stay tubes and the rear stay tubes for supporting the mudguards.

According to a modified form of the invention, the ends of the tube forming the looped frame 1 are butted together and are welded to the brackets of plates 18 which support the rear wheel spindle of the cycle. The heat and welding pressure first flattens the ends 10a of the tube 1 on the plate 18 just prior to the welding heat being applied.

In lieu of welding the joints as aforedescribed, the joints may be electrically brazed by applying a thin sheet of brazing metal between the tubes to be jointed. In this case also the tubes at the joint will be sunk into one another by the heat and pressure of the electrodes just prior to the brazing heat being applied.

A cycle frame thus constructed is formed of a small number of parts and tubular socket joints are avoided. The joints made are cleaned and therefore the need for finishing the joints with a file is obviated. The temper of the metal is not detrimentally affected as the metal is only locally heated at the joint.

Having thus described the invention what is claimed as new and desired to be secured by Letters Patent, is:

1. The process of manufacturing a cycle frame which comprises bending two tubular bars into substantially similar loops to thereby form two substantially coextensive frame parts, placing between said frame parts means forming respective accessory members of said cycle frame, whereby said frame parts are spaced from each other and arranged in side by side relation, indenting said tubular bars and said accessory members at predetermined locations thereof to thereby nest said members in said tubular bars and to bring about an interlocking effect therebetween, and finally jointing said frame parts together with said accessory members, respectively, while heat and pressure are applied at said nesting locations of said members through electrodes of an electric resistance welding machine.

2. A cycle frame comprising two co-extensive frame parts of substantially identical configuration, each frame part being made of a tubular bar bent to form a closed loop and including top and bottom frame bars connected together at the front end of said frame part and forming a curved bend thereat, a steering tube located between said two frame parts at said curved bend and contacting each of said frame parts at two spaced locations of the ends of said curved bend, said frame parts and said steering tube being provided with interlocking formations at said locations of contact whereby said frame parts are nested in said steering tube and facilitate a welding bond thereat, and a seat tube located between and contacting said two frame parts remote from said steering tube, said two frame parts being provided with recesses for jointing together said seat tube at the location of contact with said frame parts to thereby prevent angular movement between said frame parts and the seat tube and between said frame parts and said steering tube.

JOHN LEONARD HENDERSON.

REFERENCES CITED

The following references are of record in the file of this patent:

UNITED STATES PATENTS

| Number | Name | Date |
|---|---|---|
| 1,288,589 | Hood | Dec. 24, 1918 |
| 2,238,779 | Mosebach | Apr. 15, 1941 |
| 2,266,424 | Humphrey | Dec. 16, 1941 |

FOREIGN PATENTS

| Number | Country | Date |
|---|---|---|
| 17,870 | Great Britain | 1895 |
| 53,478 | Netherlands | Nov. 16, 1942 |
| 546,999 | France | Sept. 9, 1922 |